US011546292B1

(12) United States Patent
Deshpande et al.

(10) Patent No.: US 11,546,292 B1
(45) Date of Patent: Jan. 3, 2023

(54) IDENTIFYING HYBRID CONNECTIVITY FOR TRAFFIC FLOWS IN A MULTI-CLOUD ENVIRONMENT

(71) Applicant: VMWARE, INC., Palo Alto, CA (US)

(72) Inventors: Prahalad Gowardhan Deshpande, Dharwad (IN); Ambarish Prashant Pande, Akola (IN); Avinash Nigam, Guwahati (IN); Vishal Ranjan, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/572,702

(22) Filed: Jan. 11, 2022

(30) Foreign Application Priority Data

Nov. 25, 2021 (IN) .............................. 202141054491

(51) Int. Cl.
*H04L 61/4557* (2022.01)
*H04L 41/12* (2022.01)
*H04L 101/668* (2022.01)

(52) U.S. Cl.
CPC .......... *H04L 61/4557* (2022.05); *H04L 41/12* (2013.01); *H04L 2101/668* (2022.05)

(58) Field of Classification Search
CPC ................. H04L 61/4557; H04L 41/12; H04L 2101/668
See application file for complete search history.

(56) References Cited

U.S. PATENT DOCUMENTS

| 10,516,544 B2* | 12/2019 | Moreno ............... H04L 12/4633 |
| 2017/0005923 A1* | 1/2017 | Babakian ............ G06F 9/45558 |
| 2018/0212818 A1* | 7/2018 | Ide ....................... H04L 41/0654 |
| 2022/0166665 A1* | 5/2022 | O'Neil .................... H04L 41/16 |

OTHER PUBLICATIONS

Sarmiento et al., "Decentralized SDN Control Plane for a Distributed Cloud-Edge Infrastructure: A Survey", IEEE Communicatoin Surveys & Tutorials, Jan. 2021.*
Medeiros et al., "Designing and Assessing Multi-tenant Isolation Strategies for Cloud Networks", 2019 22nd Conference on Innovation in Clouds, Internet and Networks and Workshops, Feb. 19, 2019.*

* cited by examiner

*Primary Examiner* — Todd L Barker
(74) *Attorney, Agent, or Firm* — Kim & Stewart LLP

(57) ABSTRACT

An example method of identifying a hybrid connection associated with a network flow in a multi-cloud computing system includes: obtaining, by a network analyzer, network information from a plurality of data centers in the multi-cloud computing system, the plurality of data centers corresponding to a respective plurality of namespaces; identifying Internet Protocol (IP) subnetworks associated with the hybrid connection from the network information; generating connection indexes for the namespaces relating source IP subnetworks of the IP subnetworks, destination IP subnetworks of the IP subnetworks, and an identifier for the hybrid connection; searching a source IP address and a destination IP address of a flow record for the network flow in the connection indexes to obtain the identifier for the hybrid connection; and tagging the flow record with the identifier for the hybrid connection.

20 Claims, 12 Drawing Sheets

IDENTIFYING HYBRID CONNECTIVITY FOR TRAFFIC FLOWS IN A MULTI-CLOUD ENVIRONMENT

RELATED APPLICATIONS

Benefit is claimed under 35 U.S.C. 119(a)-(d) to Foreign Application Serial No. 202141054491 filed in India entitled "IDENTIFYING HYBRID CONNECTIVITY FOR TRAFFIC FLOWS IN A MULTI-CLOUD ENVIRONMENT", on Nov. 25, 2021, by VMware, Inc., which is herein incorporated in its entirety by reference for all purposes.

Modern applications can be deployed in a multi-cloud cloud fashion, that is, consuming both cloud services executing in a public cloud and local services executing in a private data center. Within the public cloud and private data center, applications are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs.

Multi-cloud strategies allow companies to make use of cutting-edge service offerings provided by various cloud vendors, while also ensuring that some workloads reside within private data centers under their observation and control. The multi-cloud data centers are connected to each other using various hybrid connectivity types, such as AWS Direct Connect™ for Amazon Web Services® (AWS®), ExpressRoute® for Microsoft Azure®, Interconnect for Google Cloud Platform (GCP®), Transit Gateways for VMware Cloud™, or a plain virtual private network (VPN). A multi-cloud strategy results in added complexity for network management, as well as troubleshooting of applications within such a heterogeneous environment. It is therefore desirable to obtain in-depth traffic visibility and metering across hybrid connectivity types in multi-cloud environments.

SUMMARY

An example method of identifying a hybrid connection associated with a network flow in a multi-cloud computing system includes: obtaining, by a network analyzer, network information from a plurality of data centers in the multi-cloud computing system, the plurality of data centers corresponding to a respective plurality of namespaces; identifying Internet Protocol (IP) subnetworks associated with the hybrid connection from the network information; generating connection indexes for the namespaces relating source IP subnetworks of the IP subnetworks, destination IP subnetworks of the IP subnetworks, and an identifier for the hybrid connection; searching a source IP address and a destination IP address of a flow record for the network flow in the connection indexes to obtain the identifier for the hybrid connection; and tagging the flow record with the identifier for the hybrid connection.

Further embodiments include a non-transitory computer-readable storage medium comprising instructions that cause a computer system to carry out the above methods, as well as a computer system configured to carry out the above methods.

DETAILED DESCRIPTION

Figure 1:
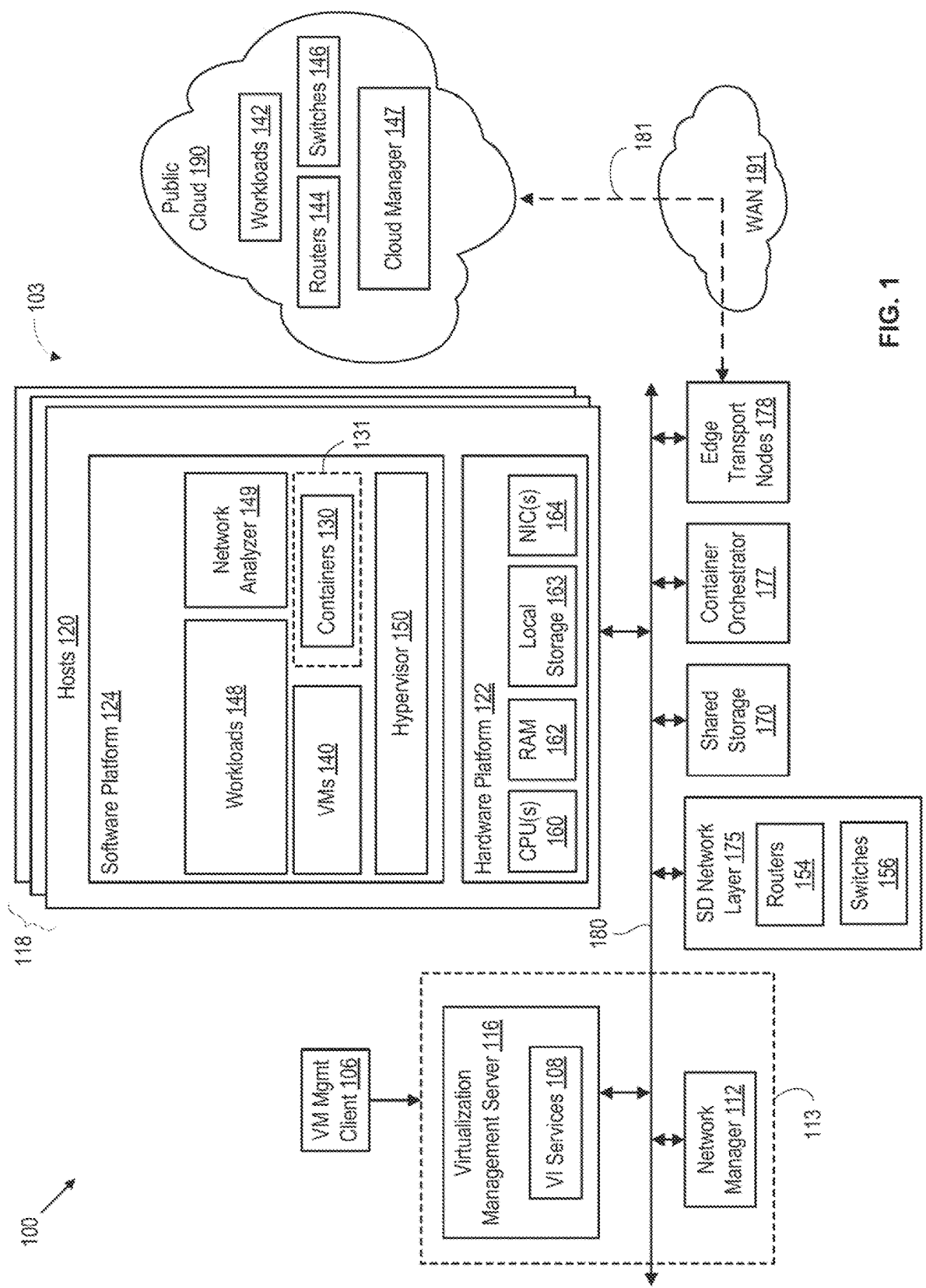
FIG. 1 is a block diagram of a virtualized computing system in which embodiments described herein may be implemented.

FIG. 1 is a block diagram of a virtualized computing system 100 in which embodiments described herein may be implemented. In embodiments, system 100 is a multi-cloud system having a data center 1.03 (e.g., a private data center) in communication with a public cloud data center ("public cloud 190"). in other embodiments, system 100 can be a plurality of private data centers or a plurality of public data centers. Data center 103 includes a cluster of hosts 120 ("host cluster 118") that may be constructed on server-grade hardware platforms such as an x86 architecture platforms. For purposes of clarity, only one host cluster 118 is shown. However, data center 103 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-teased components, such as router control VMs, load balancer VMs, edge service VMs, etc. Logical network services include logical switches 156 and logical routers 154, as well as logical firewalls, logical virtual private networks (VPNs), logical load balancers, and the like, implemented on top of the virtualized infrastructure. In embodiments, data center 103 includes edge transport nodes 1.78 that provide an interface of host cluster 118 to wide area network (WAN) 1.91 (e.g., a corporate network, the public Internet, etc.). Edge transport nodes 178 can include a gateway (e.g., implemented by a router 154) between the internal logical networking of host cluster 1.18 and the external network. Edge transport nodes 178 can be physical servers or VMs. In the context herein, routers 154 and switches 156 are described as logical network components but may interchangeably be referred to as virtual network components. Logical or virtual network components described herein are software-defined components. Data center 103 also include physical network devices (e.g. physical routers/switches) as part of physical network 180, which are not explicitly shown.

Virtualization management server 116 is a physical or virtual server that manages host cluster 118 and the virtualization layer therein. Virtualization management server 116 installs agent(s) in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents in hypervisor 150 to add a host 120 as a managed entity, referred to as a transport node. In this manner, host cluster 118 can be a cluster of transport nodes. One example of an SD networking platform that can be configured and used in embodiments described herein as network manager 112 and SD network layer 175 is a VMware NSX® platform made commercially available by VMware, Inc. of Palo Alto, Calif.

Virtualization management server 116 and network manager 112 comprise a virtual infrastructure (VI) control plane 113 of virtualized computing system 100. Virtualization management server 116 can include various VI services 108. VI services 108 include various virtualization management services, such as a distributed resource scheduler (DRS), high-availability (HA) service, single sign-on (SSO) service, virtualization management daemon, and the like. An SSO service, for example, can include a security token service, administration server, directory service, identity management service, and the like configured to implement an SSO platform for authenticating users.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like.

In embodiments, data center 103 can include a container orchestrator 177. Container orchestrator 177 implements an orchestration control plane, such as Kubernetes®, to deploy and manage applications or services thereof on host cluster 118 using containers 130. In embodiments, hypervisor 150 can support containers 130 executing directly thereon. In other embodiments, containers 130 are deployed in VMs 140 or in specialized VMs referred to as "pod VMs 131." A pod VM 131 is a VM that includes a kernel and container engine that supports execution of containers, as well as an agent (referred to as a pod VM agent) that cooperates with a controller executing in hypervisor 150 (referred to as a pod VM controller). Container orchestrator 177 can include one or more master servers configured to command and configure pod VM controllers in host cluster 118. Master server(s) can be physical computers attached to network 180 or VMs 140 in host cluster 118.

In embodiments, virtualization computing system 100 is implemented as a multi-cloud system (e.g., hybrid cloud). Data center 103 cooperates with public cloud 190. In one embodiment, data center 103 may be controlled and administrated by a particular enterprise or business organization, while a public cloud 190 is operated by a cloud computing service provider and exposed as a service available to account holders, such as the particular enterprise in addition to other enterprises. As such, data center 103 may sometimes be referred to as an on-premise data center/cloud or private data center/cloud, as opposed to public cloud 190.

Hosts 120 in data center 103 execute workloads 148 and network analyzer 149. Workloads 148 can be various applications executing in VMs 140 and/or containers 130. Network analyzer 149 can also execute in VM(s) 140 and/or container(s) 130. Network analyzer 149 functions as described herein to provide in-depth traffic visibility and metering in the multi-cloud environment. Additional workloads 142 execute in public cloud 190 (e.g., as Software-as-a-Service (SaaS) or on Infrastructure-as-a-Service (IaaS)). The virtualized infrastructure supporting workloads 142 is similar to that of data center 103 and is omitted for clarity. That infrastructure includes in particular routers 144 and switches 146, which may be physical and/or virtual, and which support workloads 142. Public cloud 190 also includes a cloud manager 147. Software can interact with cloud manager 147 to deploy IaaS, SaaS, migrate workloads between data center 103 and public cloud 190, and the like. Software can interact with cloud manager 147 to obtain information, such as network information as described below. Data center 103 communicates with public cloud 190 through WAN 191 using hybrid connections 181. Hybrid connections 181 facilitate cooperation between workloads 148 and workloads 142, allow migration of workloads between data center 103 and public cloud 190, and the like. Each hybrid connection 181 can be implemented using one of a plurality of techniques ("hybrid connection types"). Example hybrid connection types are described above (e.g., direct connections, VPNs, transit gateways, etc.).

Figure 2A:
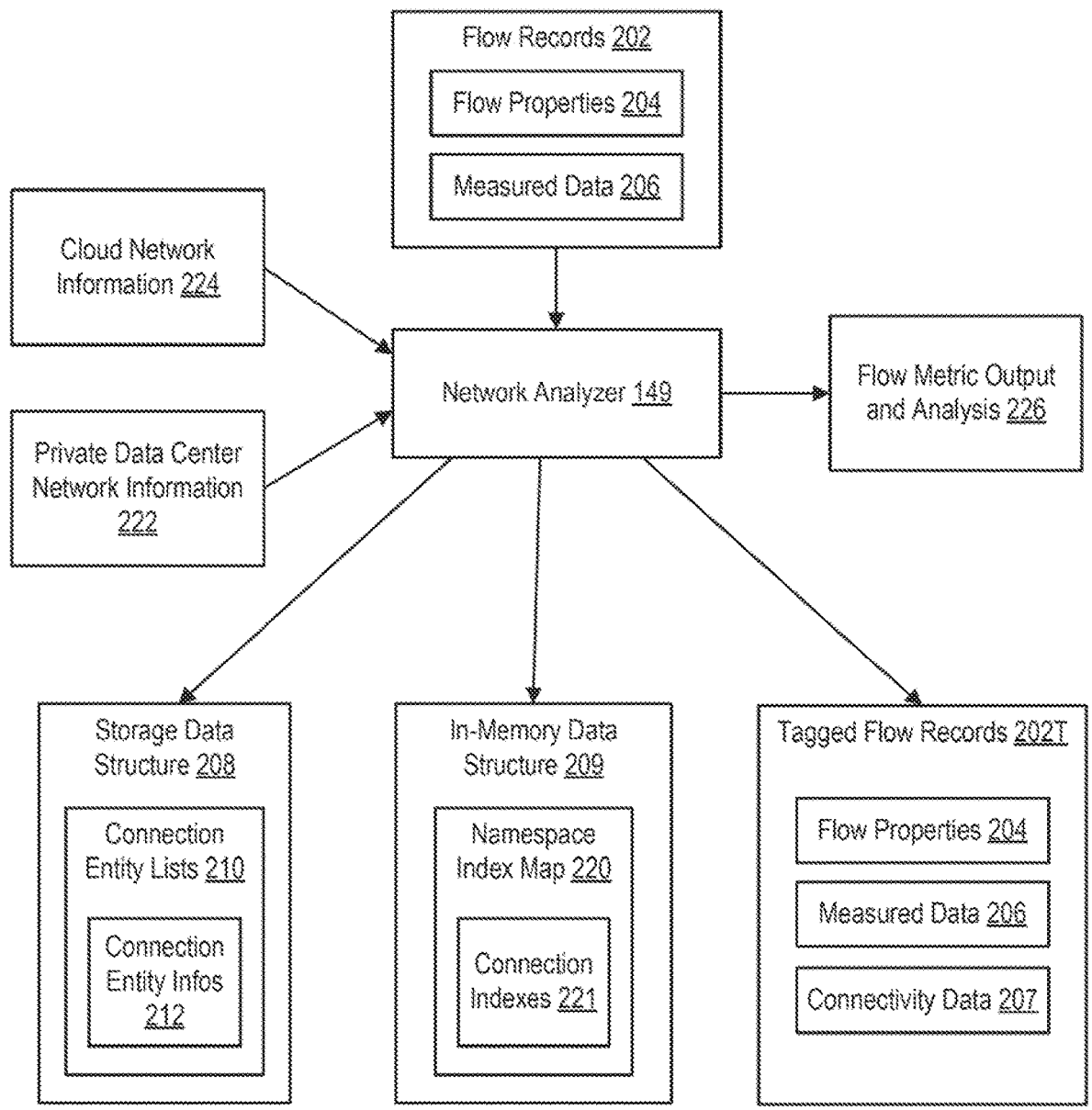
FIG. 2A is a block diagram depicting data input to and generated by a network analyzer according to embodiments.
Figure 3:
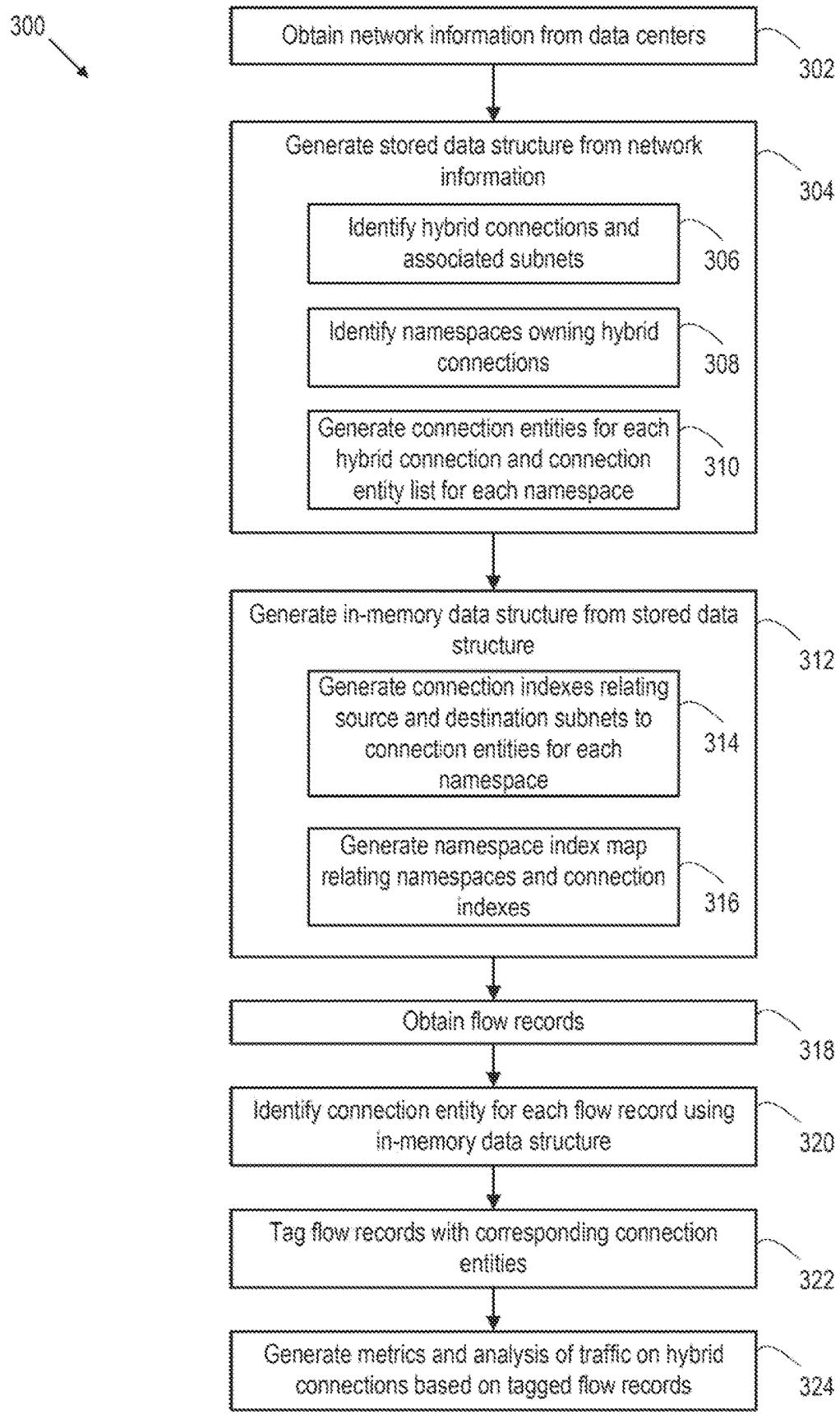
FIG. 3 is a flow diagram depicting a method of associating traffic flows with hybrid connections according to an embodiment.

FIG. 2A is a block diagram depicting data input to and generated by network analyzer 149 according to embodiments. FIG. 3 is a flow diagram depicting a method 300 of associating traffic flows with hybrid connections according to an embodiment, Referring to FIGS. 2A and 3, method 300 begins at step 302, where network analyzer 149 obtains network information from the data centers of a multi-cloud system. In embodiments. network analyzer 149 is configured to obtain network information from network manager 112 and/or components of SD network layer 175 that describes one or more of hybrid connections 181 ("private data center network information 222"). Such network information includes, for example, which endpoint(s) are used for the connection and Which sub-networks (subnets) have access to the connection (e.g., advertised subnets). Network analyzer 149 can also obtain network information ("cloud network information 224") from cloud manager 147 that describes one or more of hybrid connections 181 endpoints, learned subnets, etc.), At step 304 network analyzer 149 parses and stores the collected network information in a storage data structure 208 (e.g., a database), Generating storage data structure 208 includes: At step 306, network analyzer 149 identifies hybrid connections and associated subnets. At step 308, network analyzer 149 identifies namespaces owning endpoints of the hybrid connections. At step 310, network analyzer 1.49 generates connection entities for each hybrid connection entity list for each namespace.

Storage data structure 208 stores connection entity lists 210. Each connection entity list 210 is associated with a particular namespace. A namespace is a container representing the networking solution that manages an endpoint of a hybrid connection. For example, in FIG. 1, data center 103 is one namespace, and public cloud 190 is another namespace. Each connection entity list 210 includes one or more connection entity information structures ("connection entity infos 212") that describe a connection entity (e.g., a hybrid connection). A connection entity info 212 describes subnets associated with a hybrid connection. For example, a connection entity list 210 can be defined as follows:
  struct ConnectionEntityList {
   Set<ConnectionEntityInfo>connectionEntityInfos;
  }
where ConnectionEntityinfo is a structure corresponding to a connection entity info 212.

Figure 2B:
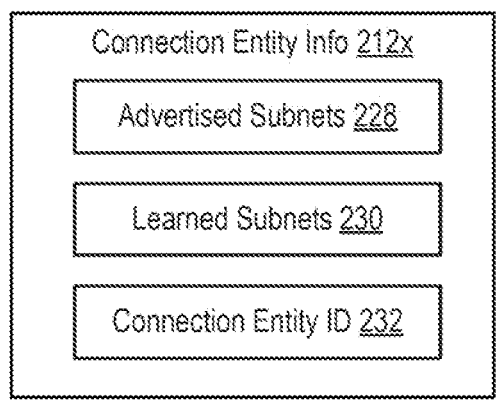
FIG. 2B is a block diagram depicting a connection entity info structure according to an embodiment.

FIG. 2B is a block diagram depicting a connection entity info structure according to an embodiment. A connection entity info 212x includes advertised subnets 228, learned subnets 230, and a connection entity identifier (ID) 232. For example, a connection entity info 212 can be defined as follows:
  struct ConnectionEntityInfo {
   Set<IPSubnet>advertisedSubnets;
   Set<IPSubnet>learnedSubnets;
   String connectionEntityId;
  }

At step 312, network analyzer 149 generates an in-memory data structure 209 from stored data structure 208. Generating in-memory data structure 209 includes: At step 314 network analyzer 149 generates connection indexes relating source and destination subnets to connection entities for each namespace. At step 316, network analyzer 149 generates a namespace index map relating namespaces and connection indexes.

As shown in FIG. 2A, in-memory data structure 209 includes a namespace index map 220. Namespace index map 220 includes connection indexes 221 associated with namespaces. For example, namespace index map 220 can be defined as follows:
  struct NamespaceindexMap {
   Map<Namespace, ConnectionIndex>indexes;
  }

Figure 2C:
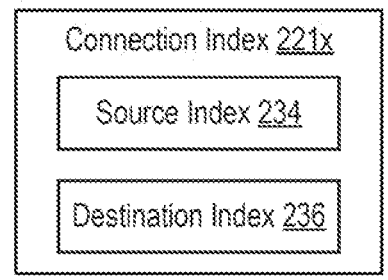
FIG. 2C is a block diagram depicting a data. structure for a connection index according to an embodiment.

FIG. 2C is a block diagram depicting a data structure for a connection index according to an embodiment. A connection index 221x includes a source index 234 and a destination index 236. In embodiments, source index 234 includes an index of advertised subnets in relation to connection entities (e.g., hybrid connections). Destination index 236 includes an index of learned subnets in relation to connection entities.

Figure 2D:
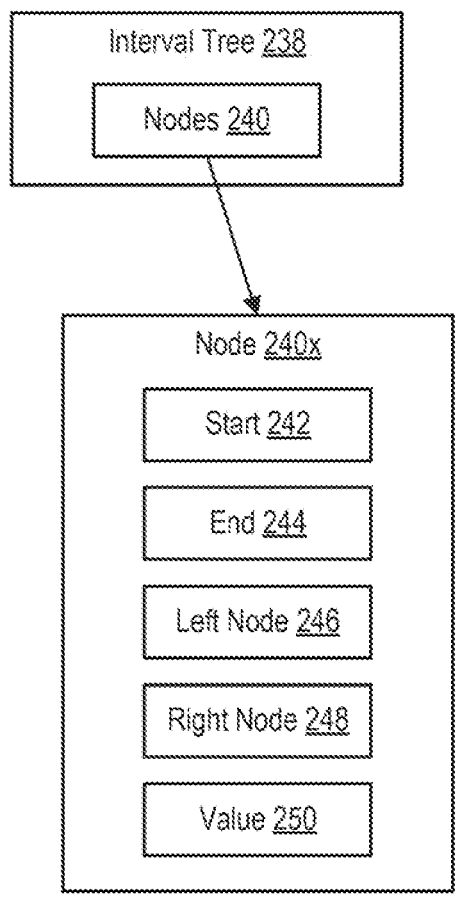
FIG. 2D is a block diagram depicting a data structure for source and destination indexes according to an embodiment.

FIG. 2D is a block diagram depicting a data structure for source and destination indexes according to an embodiment. A source index 234 or a destination index 236 can he an interval tree 238. interval tree 238 includes one or more nodes 240. A given node 240x includes a start IP of a subnet ("start 242"), an end IP of a subnet ("end 244"), a pointer to a left node ("left node 246"), a pointer to a right node ("right node 248"), and a value 250 (an ID of a connection entity). For example, a connection index 221 can be defined as follows:
  struct ConnectionIndex {
   IntervalTree sourceIndex;
   IntervalTree destIndex;
  }
An interval tree 238 can be defined as follows:
  struct IntervalTree {
   Node root;
  }
A node 240 of an interval tree 238 can be defined as follows:
  struct Node {
   long start;
   long end;
   Node left;
   Node right;
   String value;
  }
In the example, IP addresses are represented by long integers and the connection entity is represented by a string (e.g., a connection entity ID).

Returning to FIG. 3, the method continues to step 318, where network analyzer 149 obtains flow records 202. Network analyzer 149 is configured to collect flow records 202 from network devices (e.g., routers 144/154, switches 146/156, etc.). A traffic flow ("flow") is a set of packets or frames passing an observation point in the network during a certain time interval, where all packets in the flow have a set of common properties. Example properties include the 5-tuple of source and destination IP address, source and destination transport port, and transport protocol. A flow record 202 includes information about a specific flow that was observed at an observation point (e.g., a router, switch, etc.). A flow record 202 can include flow properties 204 and measured data 206. Flow properties 204 define the flow (e.g., the 5-tuple) and measured data 206 includes data collected by the observation point for the flow (e.g., a number of bytes for all packets in the flow). Example flow records include Internet Protocol Flow Information Export (IPFIX) records, sFlow ("sampled flow") records, and Net-Flow records. Further, network analyzer 149 is configured to identify namespaces for source and destination IPs of a flow record by identifying a workload for an IP address and obtaining from the workload information describing which namespace to which the workload belongs.

At step 320, network analyzer 149 identifies connection entities for flow records 202 using in-memory data structure 209. That is, some of flow records 202 can be generated from traffic that traverses a hybrid connection. Such flow records 202 themselves do not include any information identifying the hybrid connections, Network analyzer 149 uses flow properties 204 (e.g., IP source and destination addresses) to search in-memory data structure 209 and identify a hybrid connection.

At step 322, network analyzer 149 tags flow records 202 with corresponding connection entities. As shown in FIG. 2A, network analyzer 149 generates tagged flow records 202T, which include flow properties 204, measure data 206, and connectivity data 207. Connectivity data 207 identifies a hybrid connection associated with the flow.

At step 324, network analyzer 149 generates metrics and analysis of traffic on hybrid connections 181 based on tagged flow records 202T. Network analyzer 149 generates flow metric output and analysis data 226 from the tagged flow records 202T. Such analysis can include, for example, bandwidth utilization of hybrid connections, which workloads consume the most of a hybrid connection, whether a hybrid connection is being over-subscribed by workloads, which are the chattiest workloads on a hybrid connection, and the like.

Figure 4:
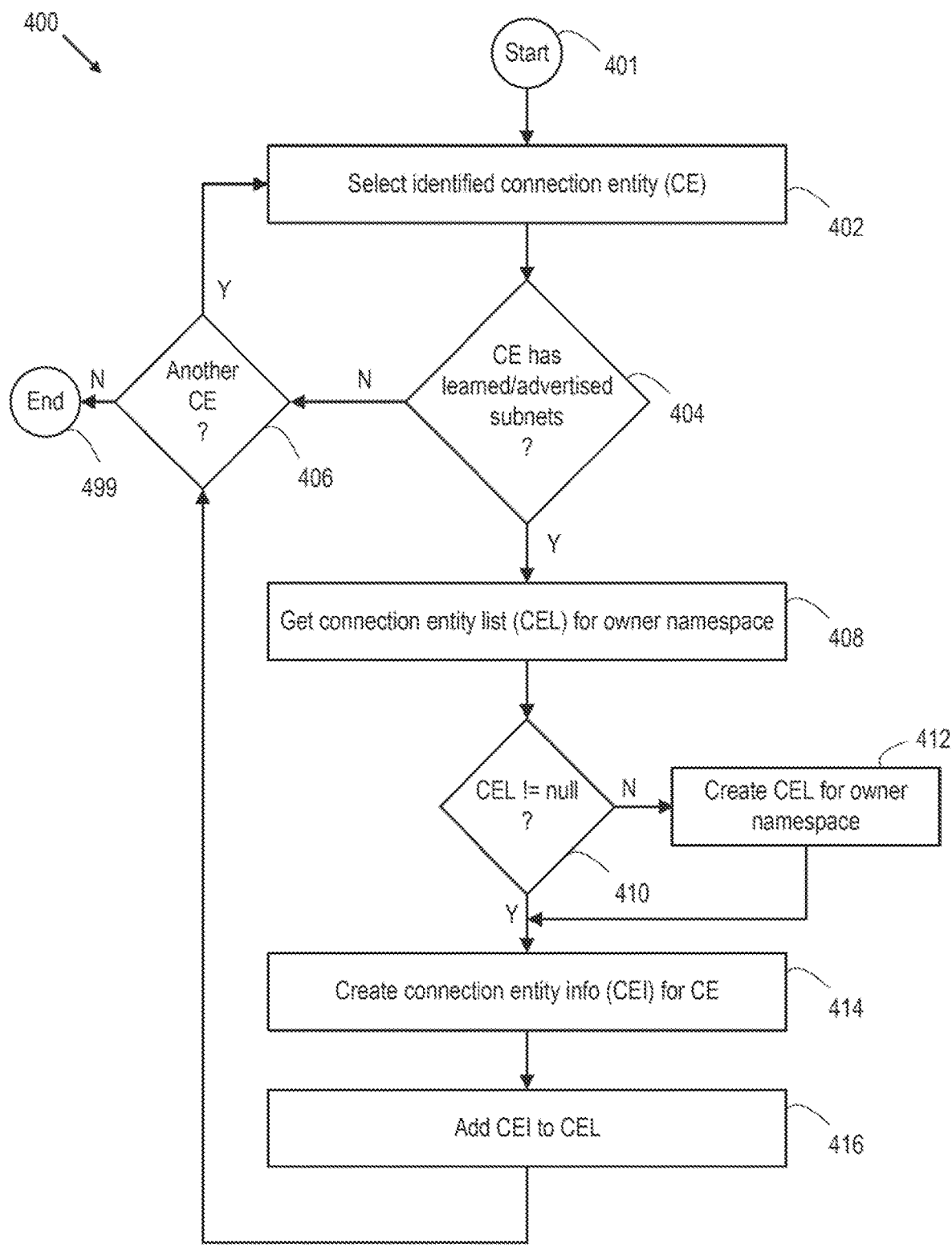
FIG. 4 is a flow diagram depicting a method of generating a connection entity list according to an embodiment.

FIG. 4 is a flow diagram depicting a method 400 of generating a connection entity list according to an embodiment. Network analyzer 149 can perform method 400 at step 304 in the method 300 described above to generate connection entity lists 210. Method 400 begins at step 401. At step 402, network analyzer 1.49 selects an identified connection entity (CE) (e.g., a. hybrid connection). At step 404, network analyzer 149 determines if the connection entity has learned and/or advertised subnets. If not, method 400 proceeds to step 406. At step 406 network analyzer 149 determines if there is another connection entity to process. If not, method 400 ends at step 499. Otherwise, method 400 returns to step 402.

If at step 404 the connection entity has learned and/or advertised subnets associated therewith, method 400 proceeds to step 408. At step 408, network analyzer 149 gets the connection entity list (CEL) for the owner namespace of the connection entity (if it exists). At step 410, if the connection entity list for the owner namespace does not exist, method 400 proceeds to step 412. At step 412, network analyzer 149 creates a connection entity list for the owner namespace and method 400 proceeds to step 414. If at step 410 the connection entity list for the owner namespace does exist, method 400 proceeds to step 414.

At step 414, network analyzer 149 creates a connection entity info (CEI) for the connection entity based on the learned and/or advertised subnets. At step 416, network analyzer 149 adds the connection entity info structure to the connection entity list.

Figure 7:
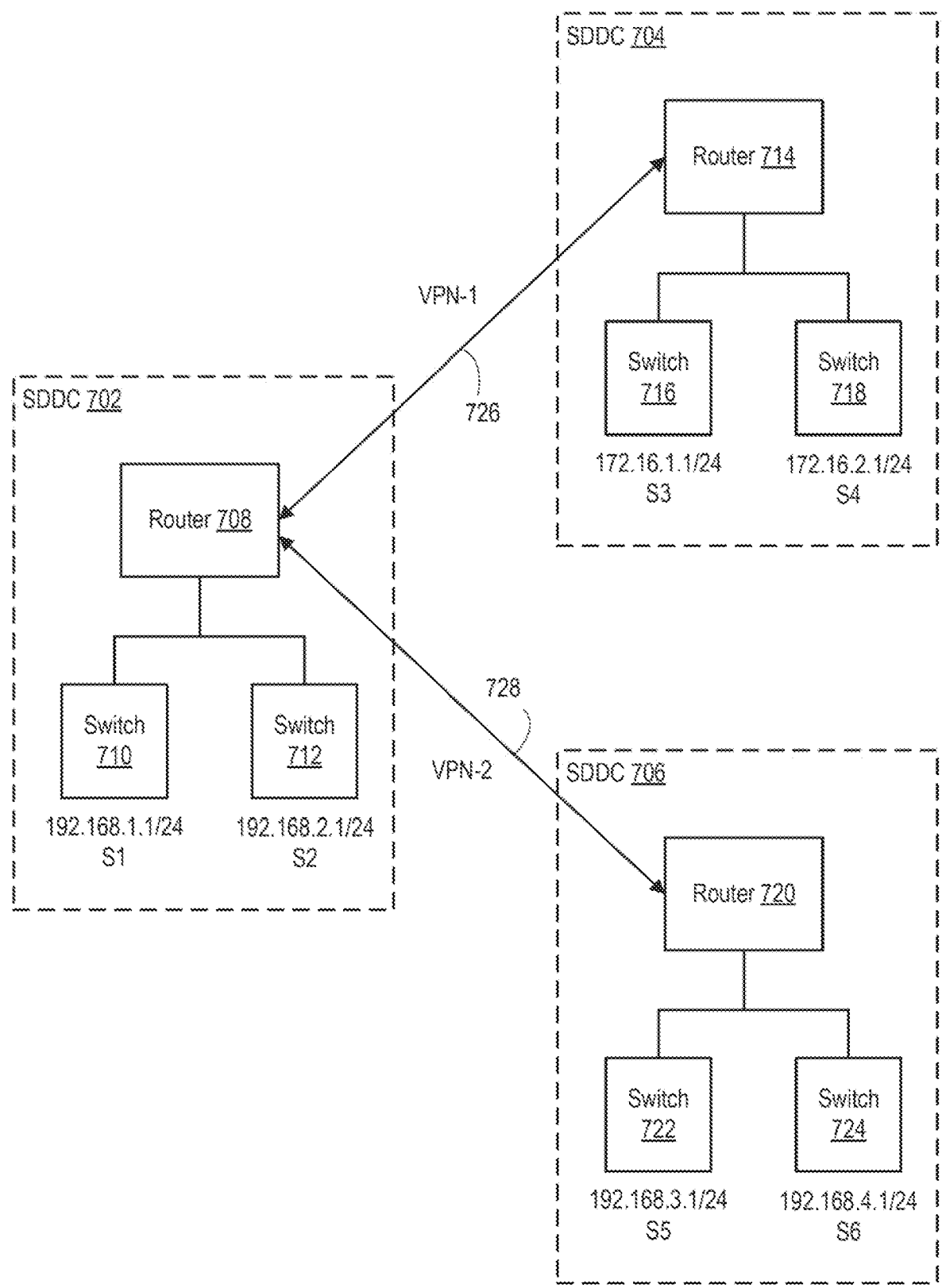
FIG. 7 is a block diagram depicting hybrid connections between data centers according to an embodiment.

FIG. 7 is a block diagram depicting hybrid connections between data centers according to an embodiment. In the example of FIG. 7, an SDDC 702 includes a router 708 and a pair of switches 710 and 712. Switch 710 is associated with subnet S1 (e.g., 192.1.68.1.1/24). Switch 712 is associated with subnet S2 (e.g., 192.168.2.1/24). SDDC 704 includes a router 714 and a pair of switches 716 and 718. Switch 716 is associated with subnet S3 (e.g., 172.16.1.1/24). Switch 718 is associated with subnet S4 (e.g., 172.16.2.1/24). An SDDC 706 includes a router 720 and a pair of switches 722 and 724. Switch 722 is associated with subnet S5 (e.g., 192.168.3.1/24). Switch 724 is associated with subnet S6 (e.g., 192.168.4/24). Routers 708 and 714 are connected by a hybrid connection 726 (e.g., VPN-1). Routers 708 and 720 are connected by a hybrid connection 728 (e.g., VPN-2).

The method 400 in FIG. 4 can be understood with respect to the example configuration shown in FIG. 7. Consider the VPN connection VPN-1 between SDDC 702 and SDDC 704. SDDC 702 advertises subnets S 1 and S2 and learns subnets S3 and S4 over VPN-1. SDDC 704 advertises subnets S3 and S4 and learns subnets S1 and S2 over VPN-1. Network analyzer 149 generates a connection entity info 212 for VPN-1 in the namespace of SDDC 702 as follows:
{
  "learnedSubnets": [
    "172.1.6.1.1/24",
    "172.16.2.1/24"
  ],
  "advertisedSubnets": [
    "192.1.68.1 1/24 ",
    "192.168.2.1/24 "
  ],
  "connectionEntityId ": "VPN-1 "
}
Network analyzer 149 generates a connection entity info 212 for VPN-1 in the namespace of SDDC 704 as follows:
{
  "learnedSubnets": [
    "192.1.68.1.1/24",
    "192.168.2.1/24"
  ],
  "advertisedSubnets": [
    "172.1.6,1.1/24",
    "172.16.2,1/24"
  ],
  "connectionEntityId": "VPN-1"
}
Network analyzer 149 generates a connection entity list 210 for the namespace of SDDC 702 as follows:
{
  "connectionEntityInfos": [
    {
      "learnedSubnets": [
        "172.16.1,1/24",
        "177.16.2.104"
      ],
      "advertisedSubnets": [
        "192.168.1.1/24",
        "192.168.2.1/24"

],
"connectionEntityId": "VPN-1"
}
]
}
Network analyzer 149 generates a connection entity list 210 for the namespace of SDDC 704 as follows:
{
  "connectionEntityInfos": [
    {
      "learnedSubnets": [
        "192.168.1.1/24",
        "192.168.2.1/24"
      ],
      "advertisedSubnets": [
        "172.16.1.1/24",
        "172.16.2.1/24"
      ]
      "connectionEntityId": "VPN-1"
    }
  ]
}

Consider the VPN connection VPN-2 between SDDC 702 and SDDC 706. SDDC 702 advertises subnets S1 and S2 and learns subnets S5 (e.g., 192.168.3.1/24) and S6 (e.g., 192.168.4.1/24) over VPN-2. SDDC 706 advertises subnets S5 and S6 and learns subnets S1 and S2 over VPN-2. Network analyzer 149 generates a connection entity info 212 for VPN-2 in the namespace of SDDC 702 as follows:
{
  "learnedSubnets": [
    "192.168.3.1/24",
    "192.168.4.1/24"
  ],
  "advertisedSubnets": [
    "192.168.1.1/24",
    "192.168.2.1/24"
  ],
  "connectionEntityId": "VPN-2"
}
Network analyzer 149 generates connection entity info 212 for VPN-2 in the namespace of SDDC 706 as follows:
{
  "learnedSubnets": [
    "192.168.1.1/24",
    "192.168.2.1/24"
  ],
  "advertisedSubnets" [
    "192.1.68.3.1/24",
    "192.168.4.1/24"
  ],
  connectionEntityId: "VPN-2"
}
The connection entity list 212 for the namespace of SDDC 702 will now be:
{
  "connectionEntityInfos": [
    {
      "learnedSubnets": [
        "172.16.1.1/24",
        "172.16.2.1/74"
      ],
      "advertisedSubnets": [
        "192.168.1.1/24",
        "192.168.2.1/24"
      ],
      "connectionEntityid": "VPN -1"
    },
    {
      "learnedSubnets": [
        "192.168.3.1/24",
        "192.168.4.1/24"
      ],
      "advertisedSubnets": [
        "192.168.1.1/24",
        "192.168.2.1/24"
      ],
      "connectionEntityId": "VPN-2"
    }
  ]
}
Network analyzer 149 generates a connection entity list 210 for the name ace of SDDC 706 as follows:
{
  "connectionEntityinfos": [
    {
      "learnedSubnets": [
        "192.168.1.1/24",
        "192.168.2.1/24"
      ],
      "advertisedSubnets": [
        "192.168.3.1/24",
        "192.168.4.1/24"
      ],
      "connectionEntityId": "VPN-2"
    }
  ]
}

Figure 5A:
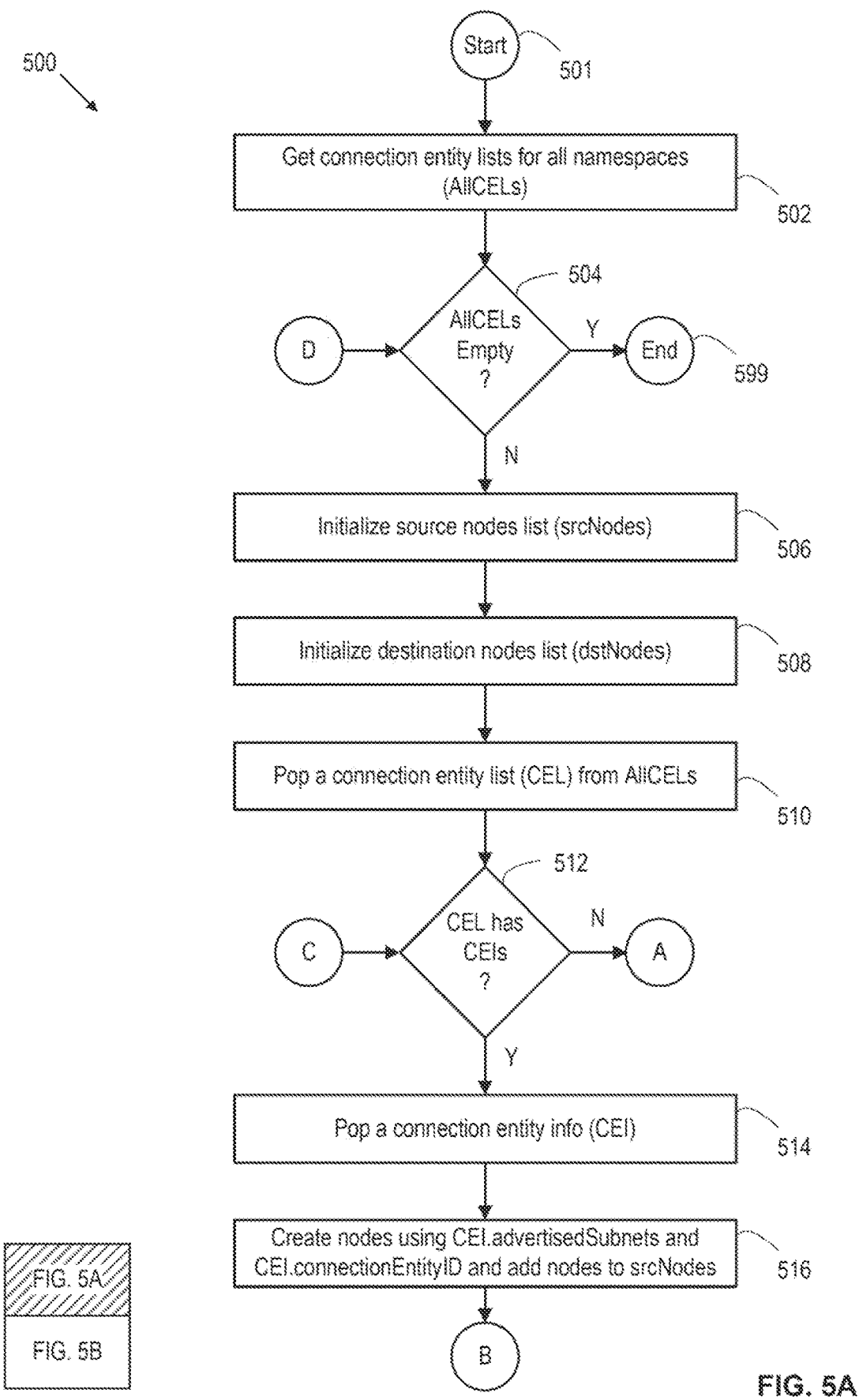
FIGS. 5A-B show a flow diagram depicting a method of generating a namespace index map according to an embodiment.
Figure 5B:
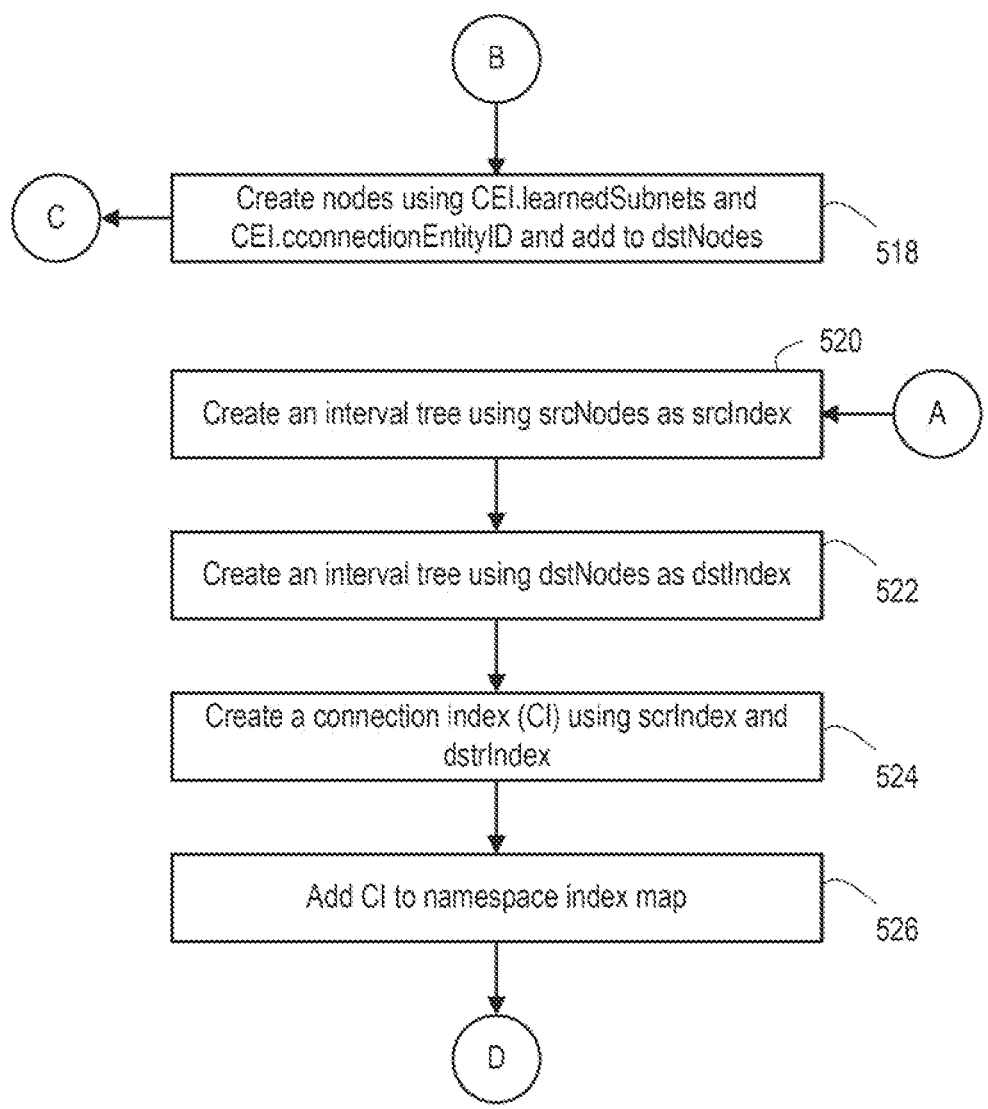

FIGS. 5A-B show a flow diagram depicting a method 500 of generating a namespace index map according to an embodiment. Network analyzer 149 can perform method 500 during step 312 of method 300 in FIG. 3 described above. Method 500 begins at step 501. At step 502, network analyzer 149 obtains connectivity entity lists 210 for all namespaces from storage data structure 208 (All CELs). At step 504, if all connectivity entity lists 210 are empty or there are no connectivity entity lists 210, method 500 ends at step 599. Otherwise, method 500 proceeds to step 506.

At step 506, network analyzer 149 initializes a source nodes list (srcNodes) to be empty. At step 508, network analyzer 149 initializes a destination nodes list (dstNodes) to be empty. At step 510, network analyzer 149 selects a connection entity list 210 from the storage data structure 208. At step 512, network analyzer 149 determines if the selected connection entity list 210 has any connection entity infos 212 (CEIs), If not, method 500 proceeds to step 520 described below. Otherwise, method 500 proceeds to step 514.

At step 514, network analyzer 149 selects a connection entity info 212 from the selected connection entity list 210. At step 516, network analyzer 149 creates nodes using advertised subnets 228 and connection entity ID 232 and adds the nodes to the source nodes list. At step 518, network analyzer 149 creates nodes using learned subnets 230 and connection entity ID 232 and adds the nodes to the destination nodes list. Method 500 then returns to step 512 to select the next connection entity info 212 if any.

After all connection entity infos 212 in the selected connection entity list 210 have been processed, method 500 reaches step 520. At step 520, network analyzer 149 creates an interval tree 238 using the source nodes list and sets the interval tree as a source index 234. At step 522, network analyzer 149 creates an interval tree 238 using the destination nodes list and sets the interval tree as a destination index

236. At step 524, network analyzer 149 creates a connection index (CI) 221 from source index 234 created in step 520 and destination index 236 created in step 522. At step 526, network analyzer 149 adds connection index 221 created in step 524 to namespace index map 220 in association with the corresponding namespace (e.g., the namespace associated with the selected connection entity list 210). Method 500 then returns to step 504 and repeats if there is another connection entity list 210 to be processed.

Continuing with the example in FIG. 7, there are three connection entity lists 210, one for each SDDC 702, 704, and 706. Consider the connection entity list 210 for the SDDC 702 set forth above. Network analyzer 149 creates similar connection indexes 221 for the namespaces of SDDC 704 and SDDC 706, which are omitted for brevity. For SDDC 702, the advertised subnets from both connection entity infos 212 become the source nodes as shown below:

```
{
  "sourceNodes": [
    {
      "start": "192.168.1.0",
      "end": "192.168.1.255",
      "value": "VPN-1"
    },
    {
      "start": "192.168.1.0",
      "end": "192.168.1.255",
      "value": "VPN-2":
    }
  ]
}
```

In embodiments, the IP addresses for start and end are stored as long integers. For purposes of clarity by example, they are shown as strings. The learned subnets from both connection entity infos 212 become the destination nodes as shown below:

```
{
  "destNodes": [
    {
      "start": "172.16.2.0",
      "end": "172.16.2.255",
      "value": "VPN-1"
    },
    {
      "start": "172.16.1.0",
      "end": "172.16.1.255",
      "value": "VPN-1"
    },
    {
      "start": "192.168.3.0",
      "end": "192.168.3.255",
      "value": "VPN-2"
    },
    {
      "start": "192..168.4.0",
      "end": "192.168.4.255",
      "value": "VPN-2"
    }
  ]
}
```

Figure 8:
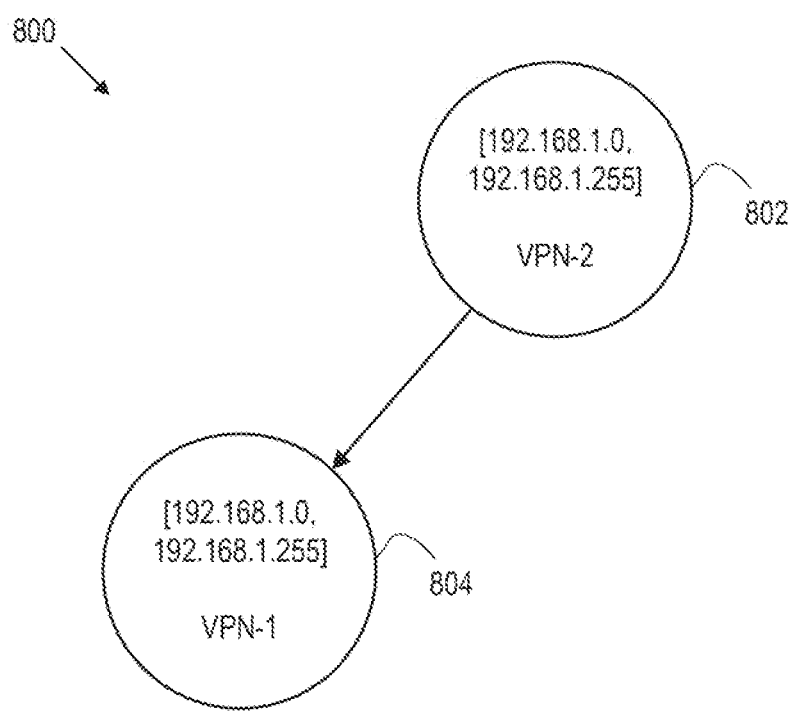
FIG. 8 is a block diagram depicting a source index interval tree according to an embodiment.

FIG. 8 is a block diagram depicting a source index interval tree 800 according to an embodiment. Network analyzer 149 generates interval tree 800 as a source index 234 in a connection index 221 for SDDC 702 based on the example above. Interval tree 800 includes a root node 802 and a child node 804. Root node 802 starts at 192.168.1.0 and ends at 192.168.1.255 and has a value of VPN-2. Child node 804 starts at 192.168.1.0 and ends at 192.168.1.255 and has a value of VPN-1.

Figure 9:
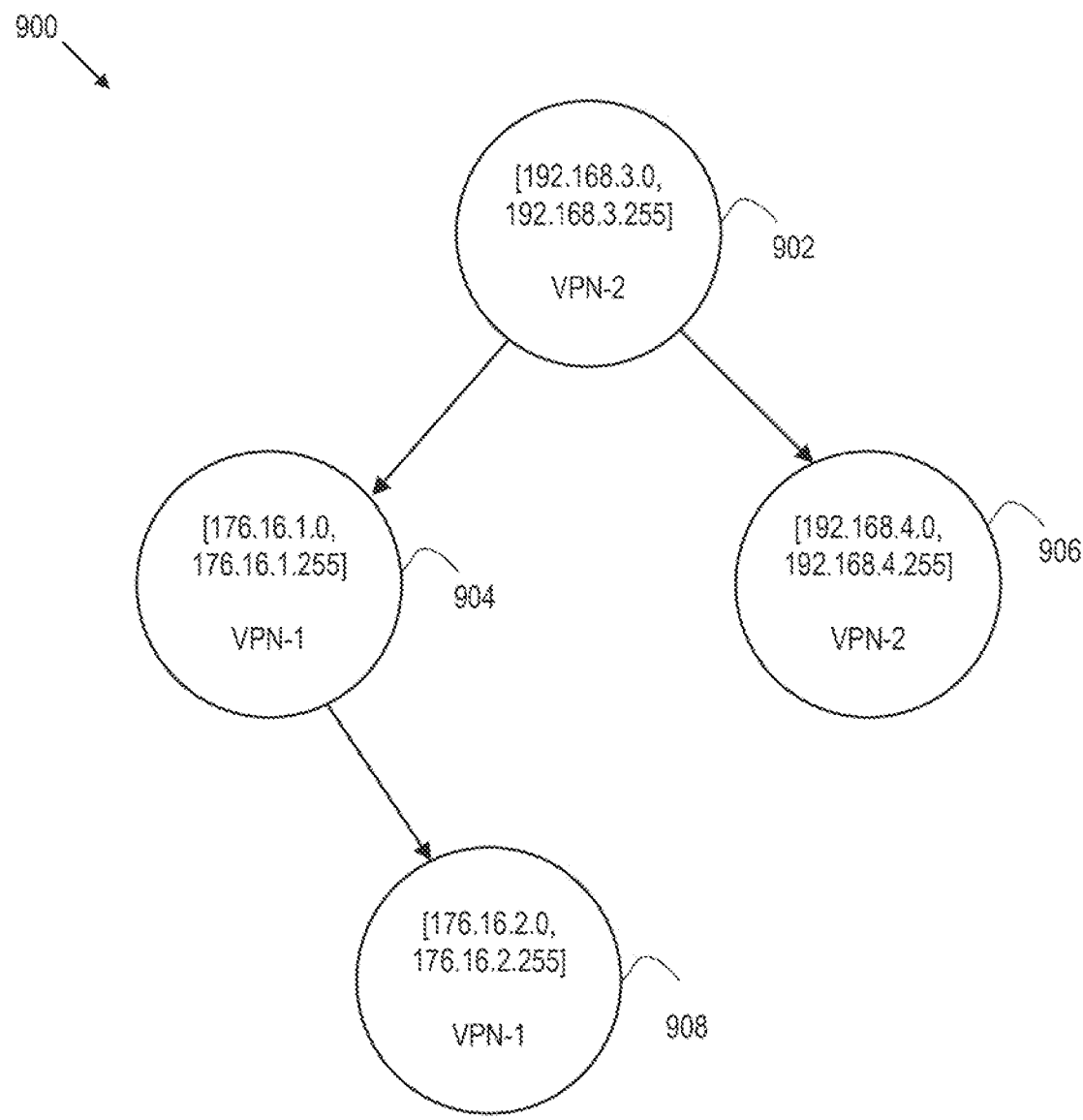
FIG. 9 is a block diagram depicting a destination index interval tree according to an embodiment.

FIG. 9 is a block diagram depicting a destination index interval tree 900 according to an embodiment. Network analyzer 149 generates interval tree 900 as a destination index 236 in a connection index 221 for SDDC 702 based on the example above. Interval tree 900 includes a root node 902 having left and right child nodes 904 and 906, respectively. Node 902 has a child node 908. Node 902 starts at 192.168.3.0 and ends at 192.168.3.255 and has a value of VPN-2. Node 904 starts at 176.16.1.0 and ends at 176.16.1.255 and has a value of VPN-1. Node 906 starts at 192.168.4.0 and ends at 192.168.4.255 and has a value of VPN-2. Node 908 starts at 176.16.2.0 and ends at 176.16.2.255 and has a value of VPN-1.

Figure 6A:
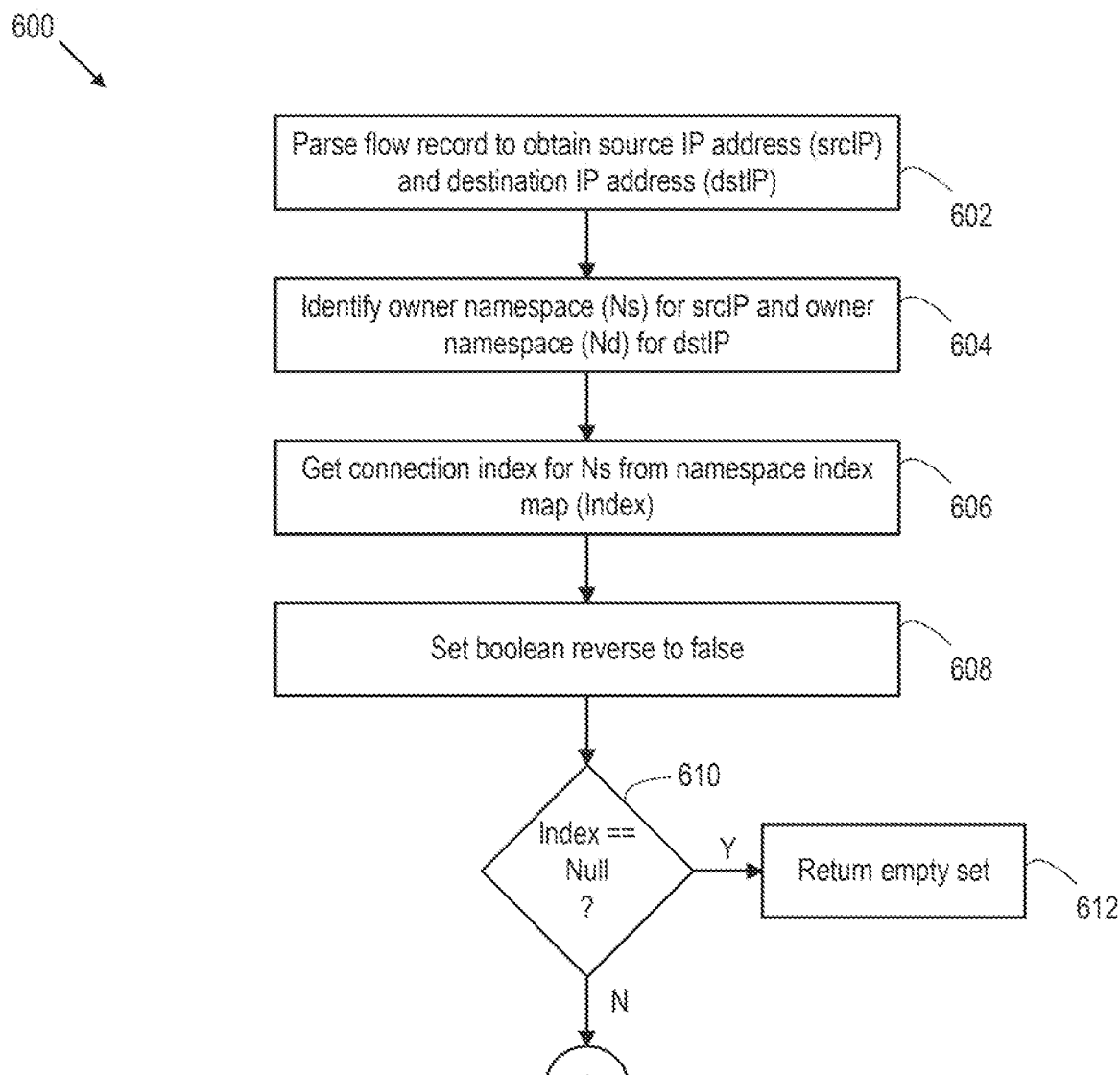
FIGS. 6A-B show a flow diagram depicting a method of identifying a connection entity for a network flow according to an embodiment.
Figure 6A:
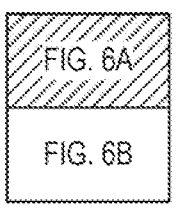
Figure 6B:
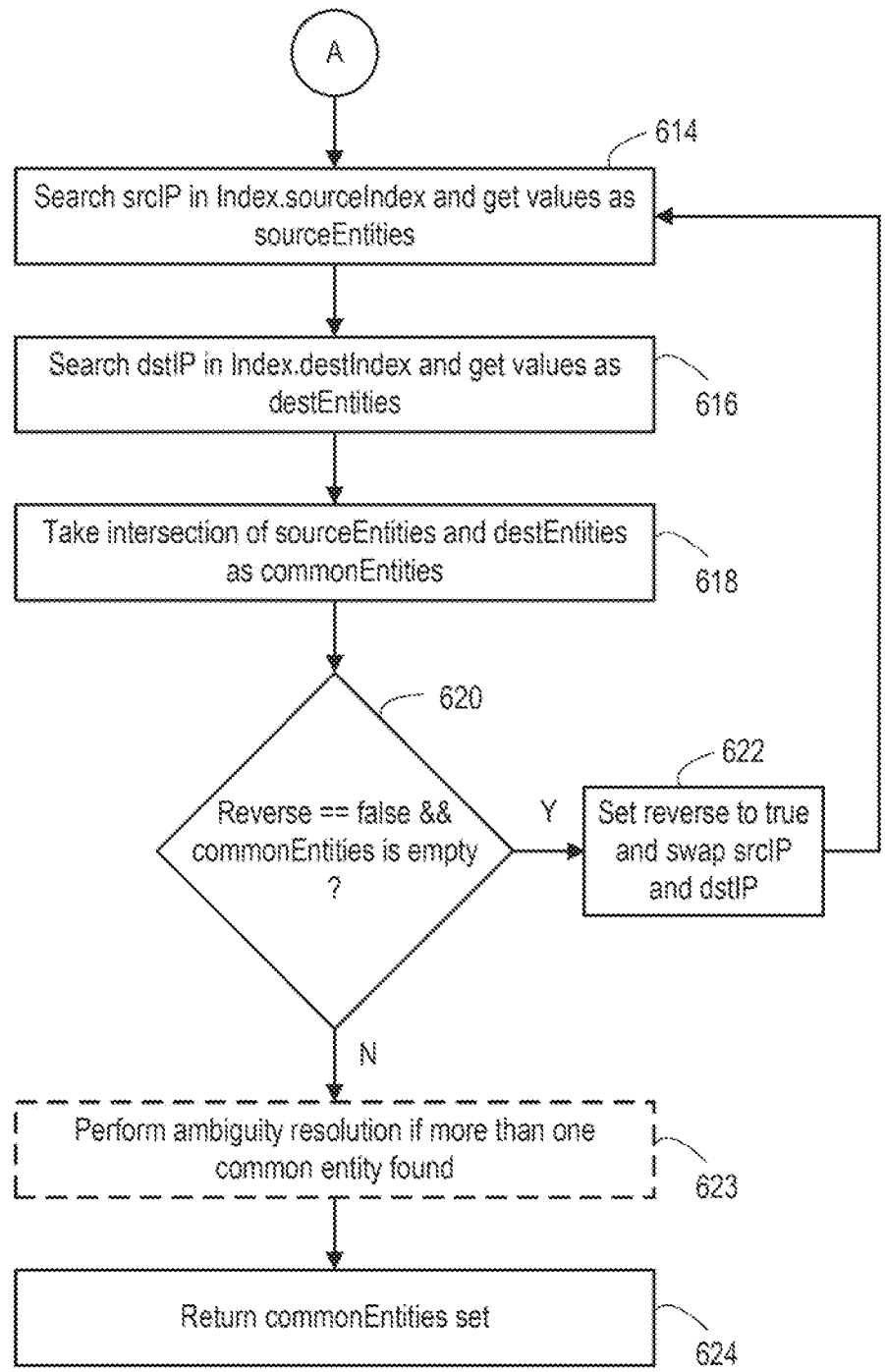

FIGS. 6A-B show a flow diagram depicting a method 600 of identifying a connection entity for a network flow according to an embodiment. Network analyzer 149 can perform method 600 during step 320 in method 300 described above. Method 600 begins at step 602, where network analyzer 149 parses a flow record to obtain the source IP address (srcIP) and the destination IP address (dstIP) of the flow. At step 604, network analyzer 149 identifies the owner namespace (Ns) for the source IP and the owner namespace (Nd) for the destination IP. At step 606, network analyzer 149 obtains a connection index 221 for the namespace (Ns) from namespace index map 220. At step 608, network analyzer 149 sets a Boolean reverse parameter to false.

At step 610, network analyzer 149 determines if the connection index obtained at step 606 is null or empty. if so, method 600 proceeds to step 612, where network analyzer 149 returns an empty set. Otherwise, method 600 proceeds from step 610 to step 614. At step 614, network analyzer 149 searches for the source IP address in source index 234 of connection index 221 and obtains value(s) for matches as source entities (if any), At step 616, network analyzer 149 searches for the destination IP address in destination index 236 of connection index 221 and obtains value(s) as destination entities (if any). At step 618, network analyzer 149 determines the intersection of the source entities and the destination entities and generates a set of common entities.

At step 620, network analyzer 149 determines if reverse is equal to false and if the set of common entities is empty. If both conditions are true, method 600 proceeds to step 622, where network analyzer 149 sets reverse to true and swaps source IP address and destination IF address (e.g., srcIP becomes the destination IP and dstIP becomes the source IP), Method 600 then returns to step 614 and continues as described above. If at step 620 at least one condition is not true, method 600 proceeds to step 624. At step 624, network analyzer 149 returns the common entities set, Which includes the identity of the connection entity associated with the flow described by the flow record.

In method 600, if the common entities set is empty, no connection entity is found for the flow of the flow record. This could occur in cases where network analyzer 149 has not collected the information about the hybrid connection that is being used by the flow (assuming the flow being processed uses a hybrid connection). If more than one common entity is found, then network analyzer 149 can perform ambiguity resolution (optional step 623). There could be cases where the same learned and advertised subnets result in more than one connection entity, For example, there could be a route-based VPN configured along with a direct connect private connection between a public cloud SDDC and an on-premise SDDC. in this case, the connection chosen is based on a configuration set by a user. For example, direct connect may be set as preferred over the VPN. This configuration can be maintained by the public cloud SDDC or the on-premise SDDC. Network analyzer 149 can obtain this configuration and select the connection entity that is preferred in the common entities include more than one connection entity.

Continuing with the example of Fig, 7, consider a flow record that has a source IP address 192.168.1.35 and a destination IP address of 172.16.1.68. Network analyzer 149 has identified the namespace. of SDDC 702 for the source IP address and the namespace of SDDC 704 for the destination IP address. Network analyzer 149 searches the source IP in source index 234 of connection index 221 for the namespace of SDDC 702 and obtains the values VPN-1 and VPN-2. Network analyzer 1.49 searches the destination IP in destination index 236 of connection index 221 for the namespace of SDDC 702 and obtains the value VPN-1. The intersection of the returned values is VPN-1, which becomes the common entity. Network analyzer 149 can then tag the flow record with VPN-1.

Another flow record can include a source IP of 192.168.3.45 (in the namespace of SDDC 706) and a destination IP of 192.1.68.2.47 (in the namespace of SDDC 702). Network analyzer 149 searches the source IP in source index 234 of connection index 221 for the namespace of SDDC 706 and obtains the value VPN-2. Network analyzer 149 searches the destination IP in the destination index 236 of the namespace of SDDC 706 and obtains the value VPN-2. Network analyzer 149 determines the intersection of the returned values, resulting in VPN-2. Network analyzer 149 can then tag the flow record with the value VPN-2.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of identifying a hybrid connection associated with a network flow in a multi-cloud computing system, comprising:
    obtaining, by a network analyzer, network information from a plurality of data centers in the multi-cloud computing system, the plurality of data centers corresponding to a respective plurality of namespaces;
    identifying Internet Protocol (IP) subnetworks associated with the hybrid connection from the network information;
    generating connection indexes for the namespaces relating source IP subnetworks of the IP subnetworks, destination IP subnetworks of the IP subnetworks, and an identifier for the hybrid connection;
    searching a source IP address and a destination IP address of a flow record for the network flow in the connection indexes to obtain the identifier for the hybrid connection; and
    tagging the flow record with the identifier for the hybrid connection.

2. The method of claim 1, further comprising:
    generating, by the network analyzer based on the network information, a first data structure, the first data structure including a connection entity list for each of the plurality of namespaces, each connection entity list including a set of connection entities, each connection entity including a set of advertised IP subnetworks, a set of learned IP subnetworks, and a connection entity identifier.

3. The method of claim 2, further comprising:
    generating, by the network analyzer, a second data structure, the second data structure including a namespace index map that maps each of the plurality of namespaces to a corresponding one of the connection indexes.

4. The method of claim 3, wherein each of the connection indexes includes a source index and a destination index, the source index relating the source IP subnetworks to the identifier of the hybrid connection, the destination index relating the destination IP subnetworks to the identifier of the hybrid connection.

5. The method of claim 4, wherein each of the source index and the destination index comprises an interval tree.

6. The method of claim 4, wherein the step of searching comprises:
identifying a first namespace of the plurality of namespaces for the source IP address;
obtaining a first connection index of the connection indexes from the namespace index map using the first namespace;
searching the source IP address in the source index to obtain a first set of values;
searching the destination IP address in the destination index to obtain a second set of values; and
determining an intersection of the first and second sets of values, the intersection including the identifier for the hybrid connection.

7. The method of claim 1, wherein the plurality of data centers include an on- premise data center and a public cloud.

8. A non-transitory computer readable medium comprising instructions to be executed in a computing device to cause the computing device to carry out a method of identifying a hybrid connection associated with a network flow in a multi-cloud computing system, comprising:
obtaining, by a network analyzer, network information from a plurality of data centers in the multi-cloud computing system, the plurality of data centers corresponding to a respective plurality of namespaces;
identifying Internet Protocol (IP) subnetworks associated with the hybrid connection from the network information;
generating connection indexes for the namespaces relating source IP subnetworks of the IP subnetworks, destination IP subnetworks of the IP subnetworks, and an identifier for the hybrid connection;
searching a source IP address and a destination IP address of a flow record for the network flow in the connection indexes to obtain the identifier for the hybrid connection; and
tagging the flow record with the identifier for the hybrid connection.

9. The non-transitory computer readable medium of claim 8, further comprising:
generating, by the network analyzer based on the network information, a first data structure, the first data structure including a connection entity list for each of the plurality of namespaces, each connection entity list including a set of connection entities, each connection entity including a set of advertised IP subnetworks, a set of learned IP subnetworks, and a connection entity identifier.

10. The non-transitory computer readable medium of claim 9, further comprising:
generating, by the network analyzer, a second data structure, the second data structure including a namespace index map that maps each of the plurality of namespaces to a corresponding one of the connection indexes.

11. The non-transitory computer readable medium of claim 10, wherein each of the connection indexes includes a source index and a destination index, the source index relating the source IP subnetworks to the identifier of the hybrid connection, the destination index relating the destination IP subnetworks to the identifier of the hybrid connection.

12. The non-transitory computer readable medium of claim 11, wherein each of the source index and the destination index comprises an interval tree.

13. The non-transitory computer readable medium of claim 11, wherein the step of searching comprises:
identifying a first namespace of the plurality of namespaces for the source IP address;
obtaining a first connection index of the connection indexes from the namespace index map using the first namespace;
searching the source IP address in the source index to obtain a first set of values;
searching the destination IP address in the destination index to obtain a second set of values; and
determining an intersection of the first and second sets of values, the intersection including the identifier for the hybrid connection.

14. The non-transitory computer readable medium of claim 8, wherein the plurality of data centers include an on-premise data center and a public cloud.

15. A virtualized computing system, comprising:
a plurality of data centers corresponding to a respective plurality of namespaces; and
a network analyzer, executing in one of the plurality of data centers, configured to identify a hybrid connection associated with a network flow by:
obtaining, by a network analyzer, network information from a plurality of data centers, the plurality of data centers corresponding to a respective plurality of namespaces;
identifying Internet Protocol (IP) subnetworks associated with the hybrid connection from the network information;
generating connection indexes for the namespaces relating source IP subnetworks of the IP subnetworks, destination IP subnetworks of the IP subnetworks, and an identifier for the hybrid connection;
searching a source IP address and a destination IP address of a flow record for the network flow in the connection indexes to obtain the identifier for the hybrid connection; and
tagging the flow record with the identifier for the hybrid connection.

16. The virtualized computing system of claim 15, wherein the network analyzer is configured to:
generate, based on the network information, a first data structure, the first data structure including a connection entity list for each of the plurality of namespaces, each connection entity list including a set of connection entities, each connection entity including a set of advertised IP subnetworks, a set of learned IP subnetworks, and a connection entity identifier.

17. The virtualized computing system of claim 16, wherein the network analyzer is configured to:
generate a second data structure, the second data structure including a namespace index map that maps each of the plurality of namespaces to a corresponding one of the connection indexes.

18. The virtualized computing system of claim 17, wherein each of the connection indexes includes a source index and a destination index, the source index relating the source IP subnetworks to the identifier of the hybrid connection, the destination index relating the destination IP subnetworks to the identifier of the hybrid connection.

19. The virtualized computing system of claim 18, wherein each of the source index and the destination index comprises an interval tree.

20. The virtualized computing system of claim 18, wherein the network analyzer is configured to perform the searching by:
   identifying a first namespace of the plurality of namespaces for the source IP address;
   obtaining a first connection index of the connection indexes from the namespace index map using the first namespace;
   searching the source IP address in the source index to obtain a first set of values;
   searching the destination IP address in the destination index to obtain a second set of values; and
   determining an intersection of the first and second sets of values, the intersection including the identifier for the hybrid connection.

\* \* \* \* \*